(12) United States Patent
Ji et al.

(10) Patent No.: US 10,423,337 B2
(45) Date of Patent: Sep. 24, 2019

(54) CONTROLLER PROCESSING DATA BASED ON A PLURALITY OF VALUES AND OPERATING METHOD THEREOF

(71) Applicant: SK hynix Inc., Gyeonggi-do (KR)

(72) Inventors: SeungGu Ji, Seoul (KR); HeeCheol Lee, Gyeonggi-do (KR); YoungHo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 23 days.

(21) Appl. No.: 15/655,146

(22) Filed: Jul. 20, 2017

(65) Prior Publication Data

US 2018/0181320 A1 Jun. 28, 2018

(30) Foreign Application Priority Data

Dec. 27, 2016 (KR) ........................ 10-2016-0180378

(51) Int. Cl.
*G06F 12/00* (2006.01)
*G06F 3/06* (2006.01)
*G06F 12/02* (2006.01)
*G06F 11/07* (2006.01)

(52) U.S. Cl.
CPC ............ *G06F 3/0616* (2013.01); *G06F 3/064* (2013.01); *G06F 3/0619* (2013.01); *G06F 3/0679* (2013.01); *G06F 11/07* (2013.01); *G06F 12/0253* (2013.01)

(58) Field of Classification Search
CPC .... G06F 3/0616; G06F 3/0619; G06F 3/0679; G06F 11/07; G06F 3/064; G06F 12/0246
See application file for complete search history.

(56) References Cited

U.S. PATENT DOCUMENTS

| 8,244,959 | B2 * | 8/2012 | Fusella | G06F 12/0246 365/185.29 |
|---|---|---|---|---|
| 2011/0191566 | A1 * | 8/2011 | Takamiya | G06F 12/10 711/206 |
| 2012/0173796 | A1 * | 7/2012 | Shen | G06F 12/0246 711/103 |
| 2012/0173797 | A1 * | 7/2012 | Shen | G06F 12/0246 711/103 |
| 2013/0311705 | A1 * | 11/2013 | Cheng | G06F 12/0246 711/103 |
| 2014/0032817 | A1 * | 1/2014 | Bux | G06F 12/0246 711/103 |
| 2014/0149647 | A1 * | 5/2014 | Guo | G06F 3/06 711/103 |
| 2015/0120989 | A1 * | 4/2015 | Xu | G06F 12/0246 711/103 |

(Continued)

*Primary Examiner* — Tasnima Matin
(74) *Attorney, Agent, or Firm* — IP & T Group LLP

(57) ABSTRACT

A controller includes a calculation unit suitable for calculating a first criteria value, a second criteria value, and a valid page ratio of each of a plurality of first memory blocks included in a first memory block group a memory device of the memory system, a decision unit suitable for deciding as a copy candidate a first memory block having a valid page ratio equal to or smaller than the first criteria value; and a processor suitable for controlling the memory device to copy data of the copy candidate to a second memory block in the memory device when the valid page ratio of the copy candidate is equal to or smaller than the second criteria value.

20 Claims, 14 Drawing Sheets

(56) References Cited

U.S. PATENT DOCUMENTS

| | | | |
|---|---|---|---|
| 2015/0378816 A1* | 12/2015 | Kawamura | G06F 3/0619 |
| | | | 714/766 |
| 2017/0371781 A1* | 12/2017 | Choi | G06F 12/0253 |
| 2018/0181320 A1* | 6/2018 | Ji | G06F 3/0616 |

* cited by examiner

CONTROLLER PROCESSING DATA BASED ON A PLURALITY OF VALUES AND OPERATING METHOD THEREOF

CROSS-REFERENCE TO RELATED APPLICATIONS

The present application claims priority of Korean Patent Application No. 10-2016-0180378, filed on Dec. 27, 2016, which is incorporated herein by reference in its entirety.

BACKGROUND

1. Field

Various embodiments of the present invention relate to a controller, and more particularly, a controller and operation method thereof.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. These portable electronic devices generally use a memory system having one or more semiconductor memory devices also referred to as data storage devices. The data storage device may be used as the main memory device or an auxiliary memory device of a portable electronic device.

Semiconductor memory devices provide excellent stability, durability, high information access speed, and low power consumption, since they have no moving parts. Examples of data storage devices include universal serial bus (USB) memory devices, memory cards having various interfaces, and solid state drives (SSD).

SUMMARY

Various embodiments are directed to a controller capable of increasing a use frequency of hot data and a lifetime of a memory system, and an operation method thereof.

In accordance with an embodiment of the present invention, a controller may include a calculation unit suitable for calculating a first criteria value, a second criteria value, and a valid page ratio of each of a plurality of first memory blocks included in a first memory block group a memory device of the memory system; a decision unit suitable for deciding as a copy candidate a first memory block having a valid page ratio equal to or smaller than the first criteria value; and a processor suitable for controlling the memory device to copy date of the copy candidate to a second memory block in the memory device when the valid page ratio of the copy candidate is equal to or smaller than the second criteria value.

Preferably, a memory cell of the second memory block may store more bits than a memory cell of each of the respective first memory block.

Preferably, an each of the first memory blocks may be a single-level cell memory block and the second memory block is a multi-level cell memory block or a triple-level cell memory block.

Preferably, the first criteria value of the respectively first memory blocks may be increased according to a first aging value of the respective first memory blocks.

Preferably, the first aging value of the respective first memory blocks may be obtained by subtracting a closed block index of the respective first memory blocks from a largest one among closed block indexes of the first memory blocks, and the closed block index of the respective first memory blocks may be a number of the other first memory blocks, which become closed until the respective first memory blocks are programmed.

Preferably, the first criteria value and the first aging value of the respective first memory blocks may have the relationship represented by the following equation 1.

$$C_{th} = \alpha \times \left(\frac{A}{\beta} + \gamma\right) \quad \text{[Equation 1]}$$

In equation 1, the $C_{th}$ may be the first criteria of the respective first memory blocks and $\alpha$, $\beta$ and $\gamma$ may be a predetermined weighted value and A may be a first aging value of the respective first memory block.

Preferably, the second criteria value of the respective first memory blocks may be increased according to a second aging value of the respective first memory blocks.

Preferably, the second aging value of the respective first memory blocks may be obtained by subtracting a copy index of the respective first memory blocks from a largest one among the closed block indexes of the first memory blocks and, a closed block Index of the respective first memory blocks may be a number of the other first memory blocks, which become closed until the respective first memory block is programmed and, the copy index may be a number of the first memory blocks, which become closed until a moment when the copy candidate is decided.

Preferably, the second criteria value and the second aging value of the respective first memory blocks may have a relationship represented by the following equation 2.

$$G_{th} = \delta \times \left(\frac{B}{\varepsilon} + \zeta\right) \quad \text{[Equation 2]}$$

In equation 2, the $G_{th}$ may be the second criteria value of the respective first memory blocks, $\delta$, $\varepsilon$ and $\zeta$ may be a predetermined weighted value and the B may be the second aging value of the respective first memory blocks.

Preferably, the processor may copy valid data among data of the copy candidate to the second memory block.

In accordance with an embodiment of the present invention, a method for operating a controller may include calculating a first criteria and a second criteria value for a valid page ratio of respective first memory blocks included in a first memory block group of a memory device; deciding as a copy candidate a first memory block, the valid page ratio of which is equal to or smaller than the first criteria value, in the first memory block group; and controlling the memory device to copy data of the copy candidate to a second memory block in the memory device when the valid page ratio of the copy candidates is equal or smaller than the second criteria value.

Preferably, a memory cell of the second memory block may store more bits than a memory cell of each of the first memory block.

Preferably, wherein each of the first memory blocks may be a single-level cell memory block and the second memory block is a multi-level cell memory block or a triple-level cell memory block.

Preferably, the first criteria value of the respective first memory blocks may be increased according to a first aging value of the respective first memory blocks.

Preferably, the first aging value of the respective first memory blocks may be obtained by subtracting a closed block index of the respective first memory blocks, and the closed block Index of the respective first memory blocks may be a number of the other first memory blocks, which become closed until the respective first memory blocks are programmed.

Preferably, the first criteria value and the first aging value of the respective first memory blocks may have the relationship represented by the following equation 1.

$$C_{th} = \alpha \times \left(\frac{A}{\beta} + \gamma\right) \quad \text{[Equation 1]}$$

In equation 1, the $C_{th}$ may be the first criteria of the each of the first memory blocks and $\alpha$, $\beta$ and $\gamma$ may be a predetermined weighted value and the A may be a first aging value of the respective first memory blocks.

Preferably, the second criteria value of the respective first memory blocks may be increased according to a second aging value of the respective first memory blocks.

Preferably, the second aging value of the respective first memory block may be obtained by subtracting a copy index of the respective first memory blocks from a largest closed block from a largest one among closed block indexes of the first memory blocks and, a closed block index of the respective first memory block may be a number of the other first memory blocks, which become closed until the respective first memory block may be programmed and, the copy index may be a number of the first memory blocks, which become closed until a moment when the copy candidate is decided.

Preferably, the second criteria value and the second aging value of the respective first memory blocks may have a relationship represented by the following equation 2.

$$G_{th} = \delta \times \left(\frac{B}{\varepsilon} + \zeta\right) \quad \text{[Equation 2]}$$

In equation 2, the $G_{th}$ may be the second criteria value of the respective first memory blocks and $\delta$, $\varepsilon$ and $\zeta$ may be a predetermined weighted value and the B may be a second aging value of the respective first memory blocks.

DETAILED DESCRIPTION

Figure 1:
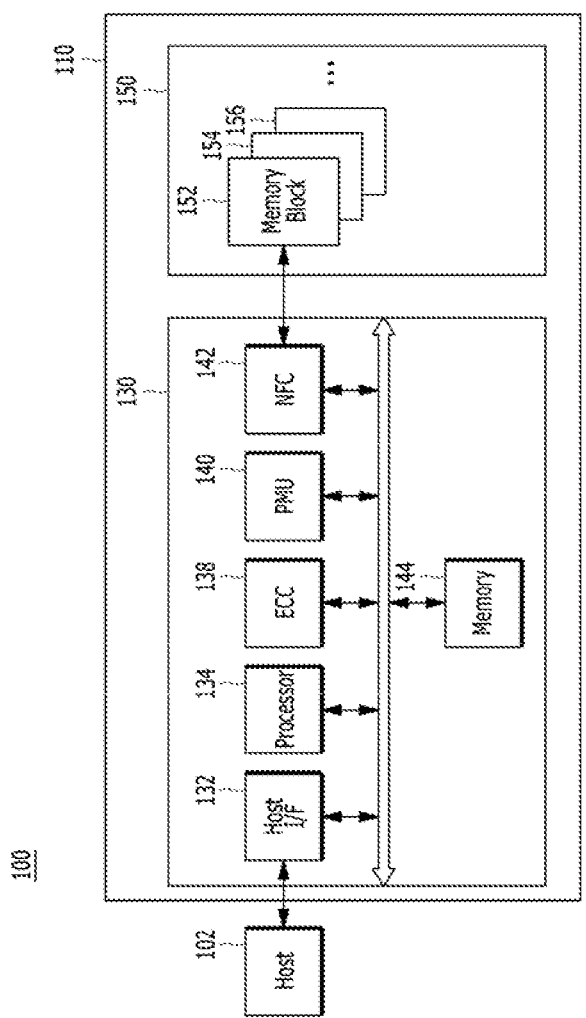
FIG. 1 is a diagram illustrating a data processing system including a memory system according to an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise (or include) or have other elements as well as those elements if there is no specific limitation. The terms of singular form may include plural forms unless stated otherwise.

FIG. 1 is a block diagram illustrating a data processing system including a memory system according to an embodiment.

Referring to FIG. 1, a data processing system 100 may include a host 102 and a memory system 110.

The host 102 may include, for example, a portable electronic device such as a mobile phone, an MP3 player and a laptop computer or an electronic device such as a desktop computer, a game player, a TV, a projector and the like.

The host 102 may include one or more operating system, and the operation system may control and manage operation and performance of the host 102, and provide inter-operation between the host 102 and user using the data processing system 100 or the memory system 110. The operating system may support operation and performance corresponding to purpose of use. For example, depending on the mobility of the host, it may be classified into a general operating system and a mobile operating system. And, depending on the environment of user, the general operating system may be classified into a personal operating system and an enterprise operating system. For example, the personal operating system may provide service for general users and include window and chrome and so on. The enterprise operating system may be specialized system to provide high quality, and include windows server, linux and unix and so on. And the mobile operating system may be specialized system to provide a system power saving function and a mobile service to users and include android, iOS, windows mobile and so on. The host 102 may include a plurality of the operating systems, and perform an operating system for operation with the memory system 110 corresponding to request of user.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetic RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device such as a solid state drive (SSD). When the memory system 110 is used as a SSD, the operation speed of the host 102 that is electrically coupled with the memory system 110 may be significantly increased.

The controller 130 and the memory device 150 may be integrated into one semiconductor device and be configured as a memory card. The controller 130 and the memory card 150 may be integrated into one semiconductor device and be configured as a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted, for example, the memory device may store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. The memory device may have any other suitable structure.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The memory 144 may store in a metadata table metadata for user data of the memory blocks 152 to 156. For example, the memory 144 may store in the metadata table a Closed Block Index CBI and valid page ratio VPR, copy candidate decision value $C_{th}$, candidate index CI and copy value $G_{th}$, and so forth for the respective memory blocks 152 to 156. The closed block index CBI may represent a number of closed memory blocks until a moment when a particular memory block is closed. The valid page ratio VPR represents a ratio of valid page among pages in a memory block. The copy candidate decision value $C_{th}$ may be used for deciding whether or not a memory block is a target of the copy operation. The candidate index CI represents a number of closed memory blocks until a moment when a particular memory block is decided as the target of the copy operation. The copy value $G_{th}$ may be used for deciding whether or not to perform the copy operation to the target. Here, the copy operation may be an operation duplicating storing data of a memory block and storing the duplicated data into another memory block. For example, the copy operation may be performed during the garbage collection operation.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
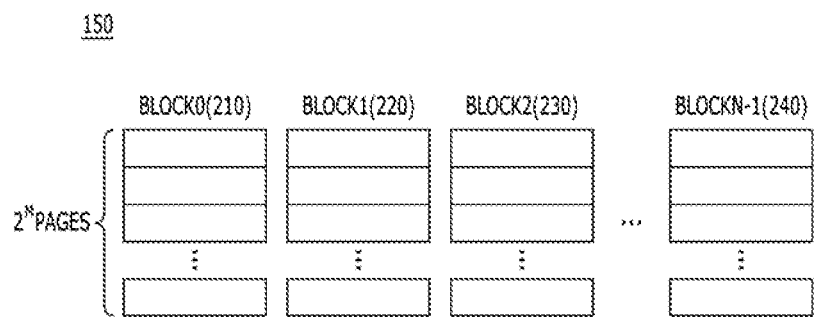
FIG. 2 is a diagram illustrating a memory device according to an embodiment of the present invention.

FIG. 2 is a schematic diagram illustrating the memory device 150 shown in FIG. 1.

Referring to FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES). Each of the plurality of pages may include a plurality of memory cells. A plurality of word lines may be electrically coupled to the memory cells.

The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
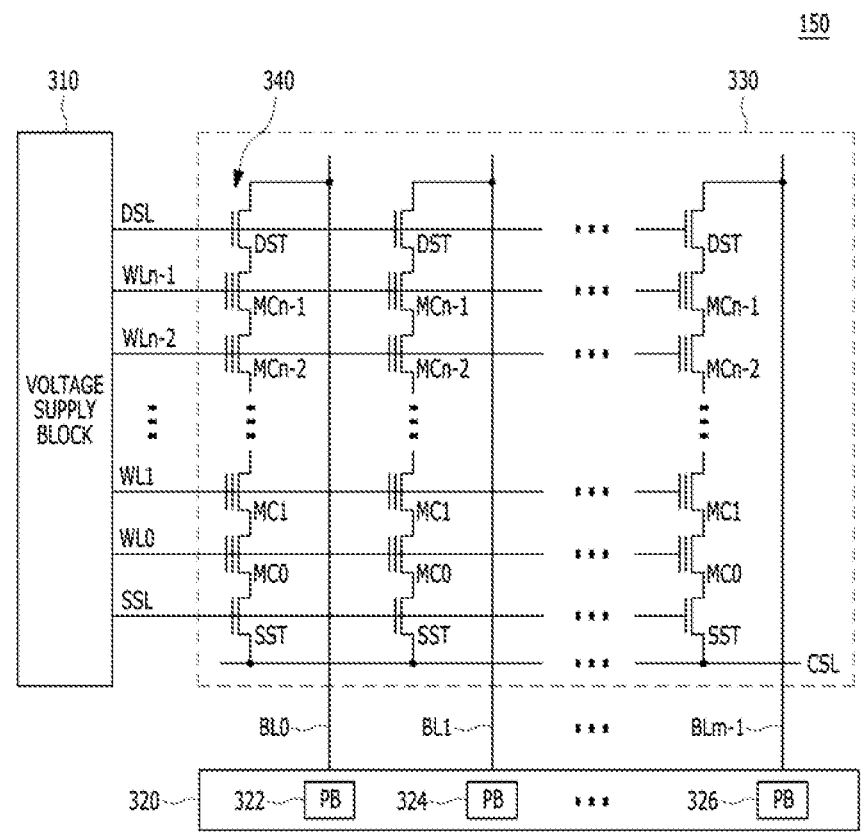
FIG. 3 is a circuit diagram illustrating a memory block in a memory device according to an embodiment of the present invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. For example, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

Figure 4:
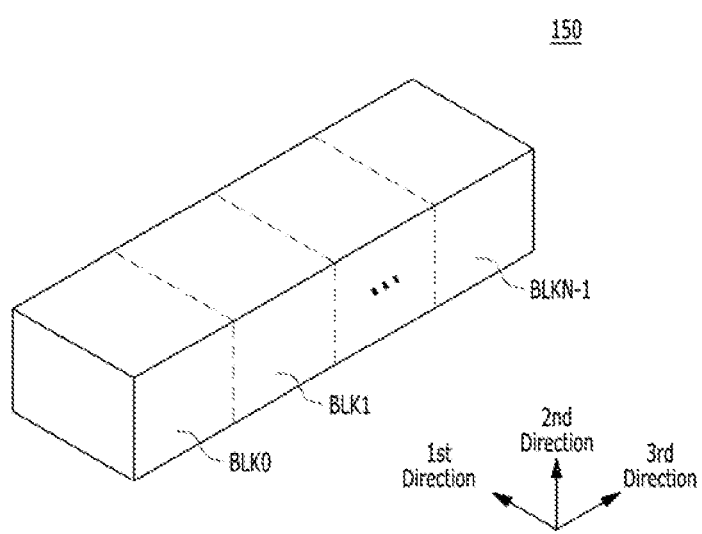
FIG. 4 is a diagram schematically illustrating an aspect of the memory device shown in FIG. 2 according to an embodiment of the present invention.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN−1, and each of the memory blocks BLK0 to BLKN−1 may be realized in a three-dimensional (3D) structure or a vertical structure. Each memory block BLK0 to BLKN−1 may include a structure which extends in first to third directions, for example, an x-axis direction, a y-axis direction and a z-axis direction.

The respective memory blocks BLK0 to BLKN−1 may include a plurality of NAND strings NS which extend in the second direction. The plurality of NAND strings NS may be provided in the first direction and/or the third directions. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

As described above, the memory system 110 may manage a plurality of memory blocks 152 to 156 included in the memory device 150 to a single-level cell memory block or a multi-level cells memory block, and program data provided from the host 102 in a single-level cell memory block or a multi-level cells memory block. And, the memory system 110 may copy a portion of data programmed in a single-level memory block to a multi-level memory block. In the following, referring to FIGS. 5 to 10, the memory system 110 is described for operation copying a portion of data programmed in a single-level cell memory block to multi-level cells memory block.

Figure 5:
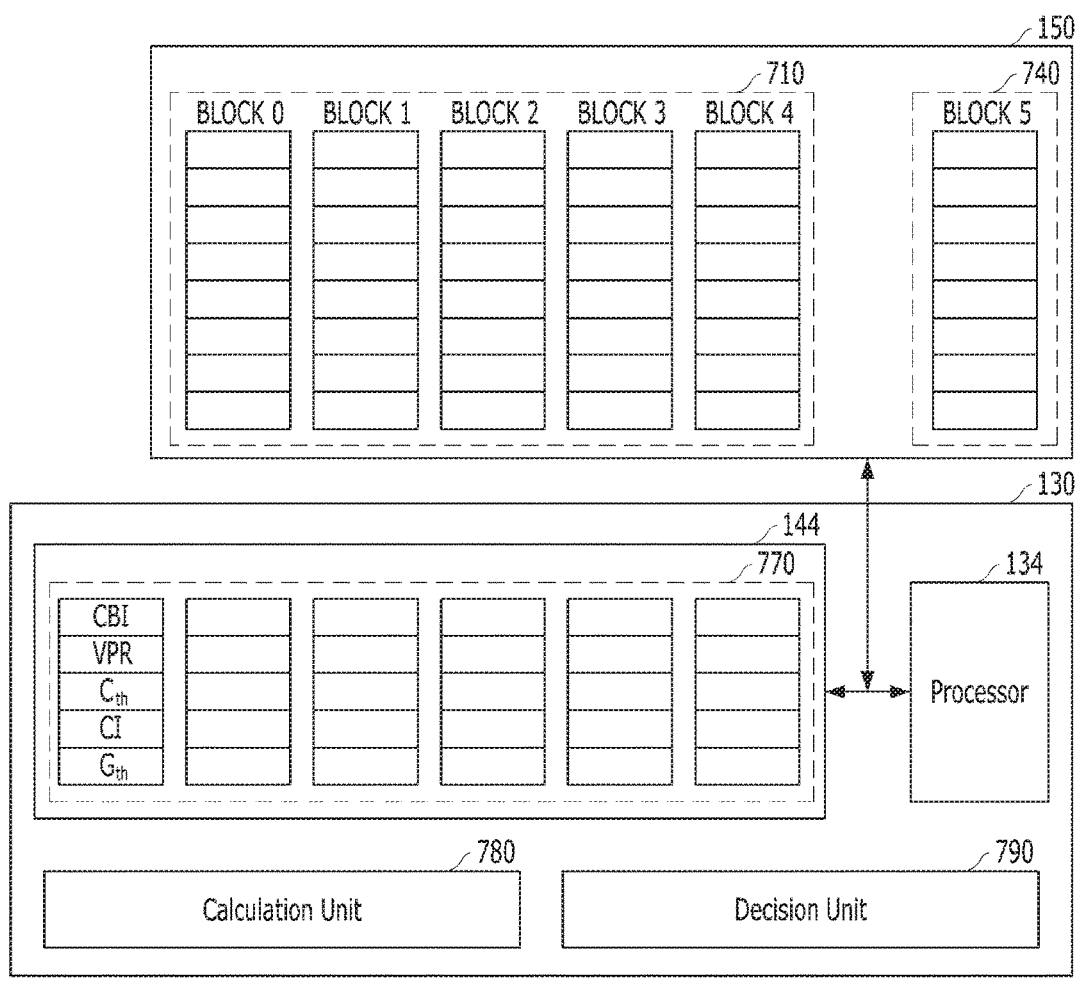
FIG. 5 is a diagram schematically illustrating a controller and a memory device in the memory system shown in FIG. 1.

FIG. 5 is a diagram schematically illustrating the controller 130 and the memory device 150 of the memory system.

For example, as shown in FIG. 5, the memory device 150 may include a first memory block group 710 including first memory blocks BLOCK 0 to 4 and a second memory block group 740 including a second memory block BLOCK 5, and each of memory blocks BLOCK 0 to 5 may have 8 pages. The first memory blocks BLOCK 0 to 4 may be a single-level cell memory block and the second memory block BLOCK 5 may be a multi-level cell memory block. The number of memory blocks in each of the first and second groups as well as the number of pages in each of the blocks illustrated in the embodiment of FIG. 5 are just examples and can be changed according to design choice. For example, the second memory block group 740 may include a plurality of second memory blocks. Also, the type of memory cells in the memory cells of each memory block of each group may vary according to design. For example, the second memory block may be a triple-level cell memory block or a quadruple-level cell memory block. As described above, the bit storage methods of the first memory block and the second memory block are different from each other, so that the present invention may provide both advantages of a single-level cell and multiple-level cell.

The calculation unit 780 may calculate a first criteria value, a second criteria value, and a valid page ratio VPR of each of a plurality of first memory blocks included in the first memory block group 710 a memory device 150 of the memory system 110.

The decision unit 790 may decide as a copy candidate a first memory block having a valid page ratio VPR equal to or smaller than the first criteria value.

The processor 134 may program data received from the host 102 into the first memory block group 710 or the second memory block group 740 and, copy the programmed data of the first memory block group 710 into the second memory block group 740. For the copy operation, the processor 134 may store in a metadata table 770 in the memory 144 of the controller 130 metadata for the data stored in the first memory block group 710. The metadata may be data for deciding a moment when the processor 134 may copy the programmed data of the first memory block group 710 to the second memory block group 740.

The memory 144 may store metadata for the first memory blocks BLOCK 0 to 4 as the metadata table 770. The metadata table 770 may store the closed block index CBI, the valid page ratio VPR, the copy candidate decision value $C_{th}$, the candidate index CI and the copy value $G_{th}$ for each of the first memory blocks BLOCK 0 to 4. The closed block index CBI represents the number of memory blocks which are closed until a moment when a corresponding first memory block is closed. For example, at first time, when the first memory block BLOCK 0 is closed, the closed block index CBI of the first memory block BLOCK 0 is '0'. And then, when the first memory block BLOCK 1 is closed, the closed block Index CBI of the first memory block BLOCK 1 is '1'. The valid page ratio VPR represents the ratio of pages storing valid data among pages included in a corresponding first memory block. The candidate decision value $C_{th}$ may be a criteria value for deciding whether a corresponding first memory block is a copy candidate (i.e., a target of a copy operation as defined above). The candidate index CI represents the number of the first memory block closed until a moment when a corresponding first memory block is decided as the copy candidate. The copy value $G_{th}$ may be a criteria value for deciding whether or not to perform a copy operation to a corresponding first memory block which is decided to be a copy candidate.

The processor 134 may calculate the copy candidate decision value $C_{th}$ of each of the first memory blocks BLOCK 0 to 4 using following equation 1. The processor 134 may store the copy candidate decision value $C_{th}$ of each of the first memory blocks BLOCK 0 to 4 in the memory 144

$$C_{th}(i) = \alpha \times \left(\frac{A(i)}{\beta} + \gamma\right) \qquad \text{[Equation 1]}$$

In equation 1, $C_{th}(i)$ represents the copy candidate decision value of the I-th first memory block, and a and 3 represents predetermined weights and γ represents a predetermined correction value. The A(i) represents a first aging value of the i-th first memory block. The first aging value of the i-th first memory block may be a value obtained by subtracting the closed block index CBI of the i-th first memory block from the largest closed block index CBI among the closed block indexes CBI.

In the following, it is assumed that α, β and γ are 0.25, 1 and 1, respectively.

The processor 134 may calculate the copy value $G_{th}$ for each of the first memory blocks BLOCK 0 to 4 using the following equation 2. The processor 134 may store the copy value $G_{th}$ of each of the first memory blocks BLOCK 0 to 4.

$$G_{th}(i) = \delta \times \left(\frac{B(i)}{\varepsilon} + \zeta\right) \quad \text{[Equation 2]}$$

In equation 2, $G_{th}(i)$ represents the copy value of the i-th first memory block, and δ and ε represent predetermined weights and ζ represents a predetermined correction value. The B(i) may be a second aging value of the i-th first memory block. The second aging value of the i-th first memory block may be obtained by subtracting the candidate index CI of the i-th first memory block from the largest closed block index CBI among the closed block indexes CBI.

In the following, it is assumed that δ, ε and ζ are 0.30, 1 and 1, respectively.

Referring to equations 1 and 2, the copy candidate decision value $C_{th}$ and the copy value $G_{th}$ of the i-th first memory block may be increased as the largest closed block index CBI is increased.

The processor 134 may determine as a copy candidate the first memory block, the valid page ratio VPR of which is equal to or smaller than the copy candidate decision value $C_{th}$ in the first memory block group 710.

Figure 6:
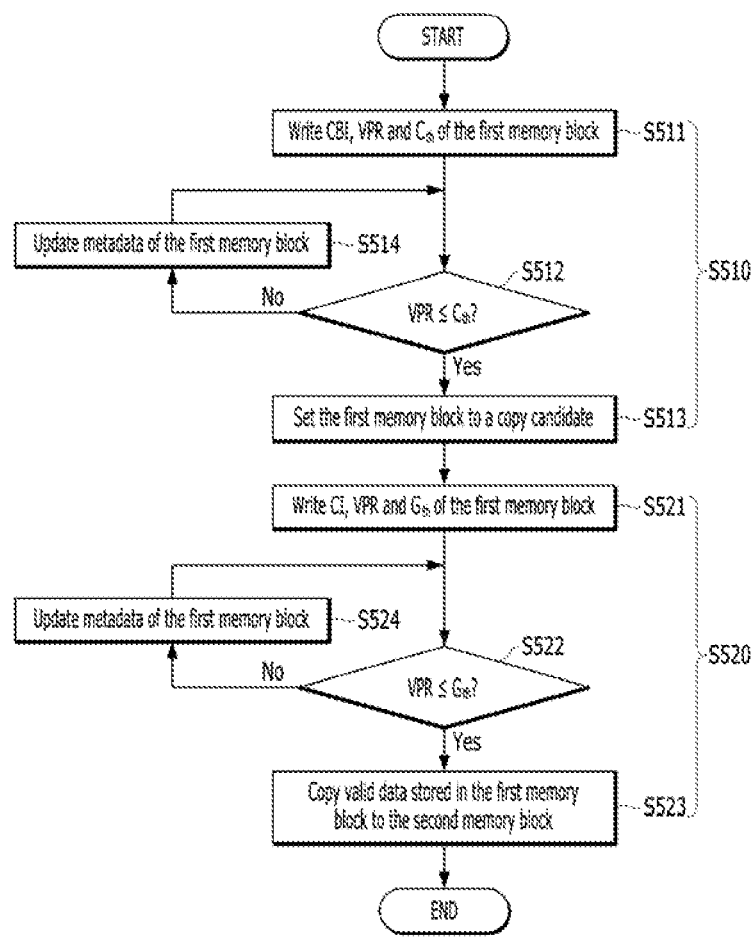
FIG. 6 is a flowchart illustrating an operation of the memory system according to an embodiment of the present invention.

FIG. 6 is a flowchart illustrating operation of the memory system 110 according to an embodiment of the present invention.

As shown in FIG. 6, in step S510, the memory system 110 may perform a copy candidate decision operation to each of the first memory blocks BLOCK 0 to 4. In step S520, the memory system 110 may perform a copy operation to each of the copy candidates among the first memory blocks BLOCK 0 to 4. Step S510 may include a plurality of steps S511 to S514, and step S520 may include a plurality of steps S521 to S524.

First, in step S511, the processor 134 may write in the metadata table 770 the closed block index CBI, the valid page ratio VPR and the copy candidate decision value $C_{th}$ of a closed one among the first memory blocks BLOCK 0 to 4. The closed first memory block is the first memory block programmed completely. In step S512, the processor 134 may compare the copy candidate decision value $C_{th}$ with the Valid Page Ratio VPR of the closed first memory block.

When the Valid Page Ratio VPR of the closed first memory block is equal to or smaller than the copy candidate decision value $C_{th}$, in step S513, the processor 134 may decide the closed first memory block as the copy candidate.

However, when the valid page ratio VPR of the closed first memory block is more than the copy candidate decision value $C_{th}$, in step S5514, the processor 134 may update the metadata, that is the valid page ratio VPR and the copy candidate decision value $C_{th}$ of the closed first memory block. The processor 134 may perform the update operation to the closed first memory block when the valid page ratio VPR of the closed first memory block is changed or the largest closed block index CBI is increased.

In step S521 after step S513, the processor 134 may write in the metadata table 770 the candidate index CI, the valid page ratio VPR and the copy value $G_{th}$ of the closed first memory block.

In step S522, the processor 134 may compare the copy value Gut with the valid page ratio VPR of the closed first memory block which is decided as the copy candidate.

When the valid page ratio VPR is equal to or smaller than the copy candidate decision value $C_{th}$, in step S523, the processor 134 may copy valid data stored in the copy candidate to a second memory block included in the second memory block group 740.

However, when the valid page ratio VPR is more than the copy candidate decision value $C_{th}$ of the copy candidate, in step 524, the processor 134 may update the metadata, that is the valid page ratio VPR and the copy candidate decision value $C_{th}$ of the copy candidate. The processor 134 may perform the update operation to the closed first memory block decided as the copy candidate when the valid page ratio VPR of the copy candidate is changed or the largest closed block index CBI is increased.

Described below with reference to FIGS. 7 to 10 will be step S510 and S520 as time lapses.

FIGS. 7 to 10 are diagrams schematically illustrating data stored in the memory 144 and the memory device 150 according to the operation shown in FIG. 6.

Figure 7:
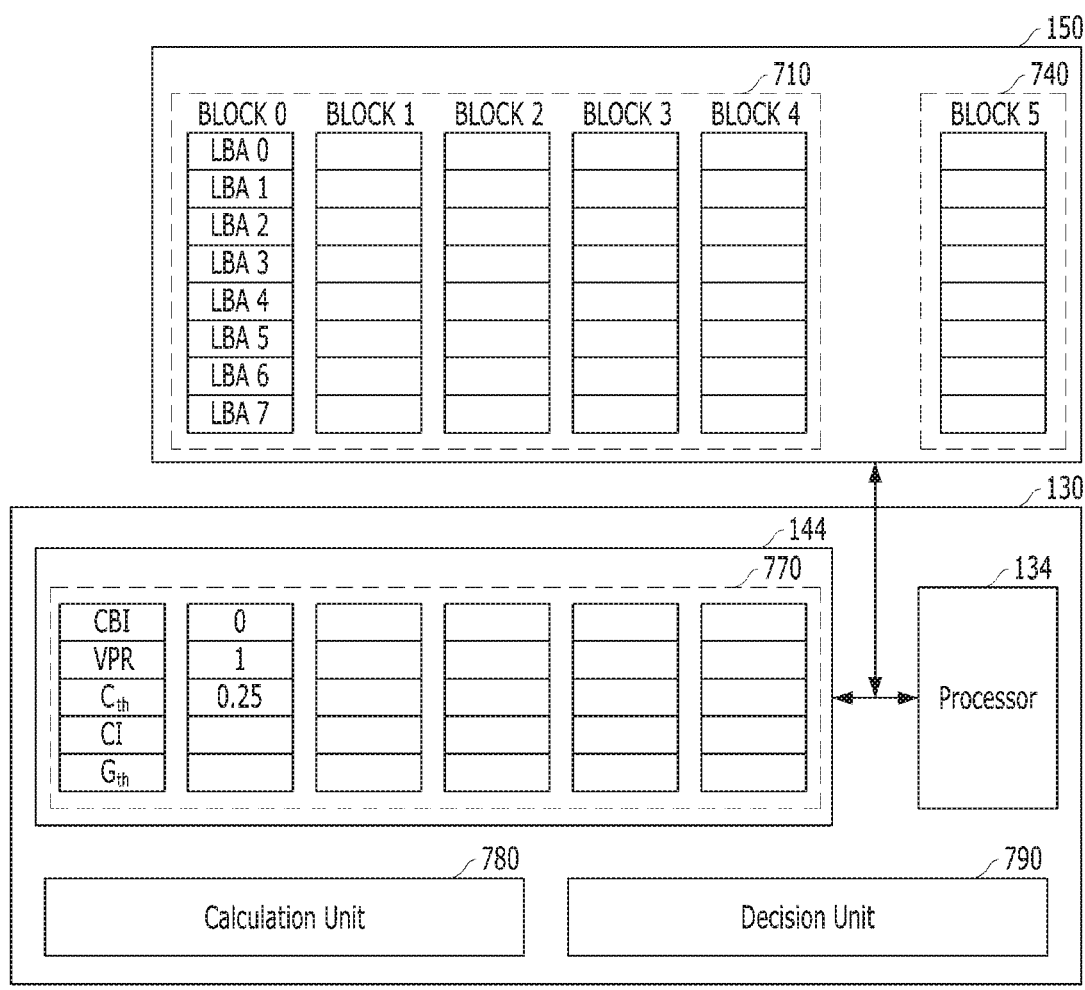
FIGS. 7 to 10 are diagrams schematically illustrating data stored in the memory and the memory device according to operation shown in FIG. 6.

FIG. 7 shows an example case where the first memory block BLOCK 0 is closed after the processor 134 programs logic address data LBA 0 to 7 corresponding to 0th to 7th logic addresses to the first memory block BLOCK 0 of the first memory block group 710.

FIG. 7 exemplifies the first memory block BLOCK 0 as firstly programmed and closed. Due to the closed first memory block BLOCK 0, the processor 134 may write or update the metadata of the closed first memory block BLOCK 0 in the metadata table 770 of the memory 144.

Also, referring to FIG. 7, since the valid page ratio VPR (exemplarily having a value '1') exceeds the copy candidate decision value $C_{th}$(exemplarily having a value '0.25') of the closed first memory block BLOCK 0, the processor 134 may perform step S514 instead of step S513 to the closed first memory block BLOCK 0. Accordingly, as exemplified in FIG. 7, the metadata (i.e., the candidate index CI and the copy value $G_{th}$) for the closed first memory block BLOCK 0 may not be written or updated in the metadata table 770 for the closed first memory block BLOCK 0 according to step S513 and the subsequent steps.

Figure 8:
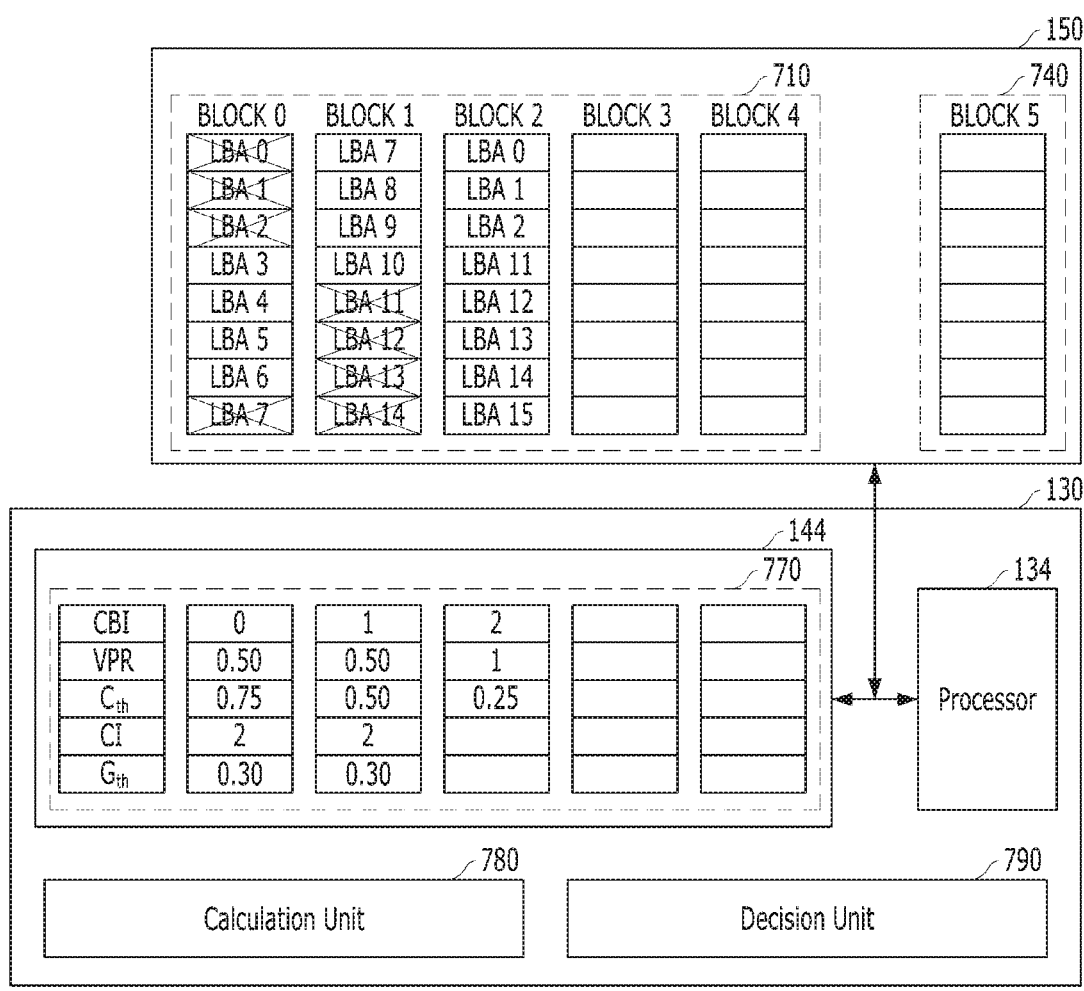

FIG. 8 shows an example case where the first memory block BLOCK 1 is closed after the processor 134 programs $7^{th}$ to $14^{th}$ logic address data LBA 7 to 14 corresponding to $7^{th}$ to $14^{th}$ logic addresses to the first memory block BLOCK 1 of the first memory block group 710, and then the first memory block BLOCK 2 is closed after the processor 134 programs $0^{th}$ to $2^{nd}$ and $11^{th}$ to $15^{th}$ logic address data LBA 0 to 2 and 11 to 15 corresponding to $0^{th}$ to $2^{nd}$ and $11^{th}$ to $15^{th}$ logic addresses to the first memory block BLOCK 2 of the first memory block group 710.

FIG. 8 shows the first memory blocks BLOCK 1 and 2 sequentially programmed and closed after completion of steps S510 and S520 for the first memory block BLOCK 0 as described with reference to FIG. 7. Due to the closed first memory blocks BLOCK 1 and 2, the processor 134 may write or update the closed block index CBI, the valid page ratio VPR and the copy candidate decision value $C_{th}$ of each of the closed first memory blocks BLOCK 0 to 2 in the metadata table 770 of the memory 144.

Since the Valid Page Ratio VPR (exemplarily having a value '1') exceeds the copy candidate decision value $C_{th}$ (exemplarily having a value '0.25') of the first memory block BLOCK 2, the processor 134 may perform step S514 instead of step S513 to the closed first memory block BLOCK 2. Accordingly, as exemplified in FIG. 8, the metadata (i.e., the candidate index CI and the copy value $G_{th}$) for the closed first memory block BLOCK 2 may not be written or updated in the metadata table 770 for the closed first memory block BLOCK 2 according to step S513 and the subsequent steps.

However, since the valid page ratios VPRs (exemplarily having values '0.5' and '0.5') are respectively equal to or smaller than the copy candidate decision values $C_{th}$ (exemplarily having values '0.75' and '0.5') of the respective closed first memory blocks BLOCK 0 and 1, the processor 134 may perform step S513 to the first memory blocks BLOCK 0 and 1. Therefore, as exemplified in FIG. 8, the candidate index CI and the copy value $G_{th}$ may be written or updated in the metadata table 770 for the first memory blocks BLOCK 0 and 1.

Also, since the valid page ratios VPRs (exemplarily having values '0.5' and '0.5') of the respective first memory blocks BLOCK 0 and 1 exceed the copy value $G_{th}$ (exemplarily having values '0.3' and '0.3), the processor 134 may perform step S524 instead of step S523 to the respective first memory blocks BLOCK 0 and 1. Accordingly, valid data stored in the first memory blocks BLOCK 0 and 1 may not be copied into the second memory block BLOCK 5, as exemplified in FIG. 8.

Figure 9:
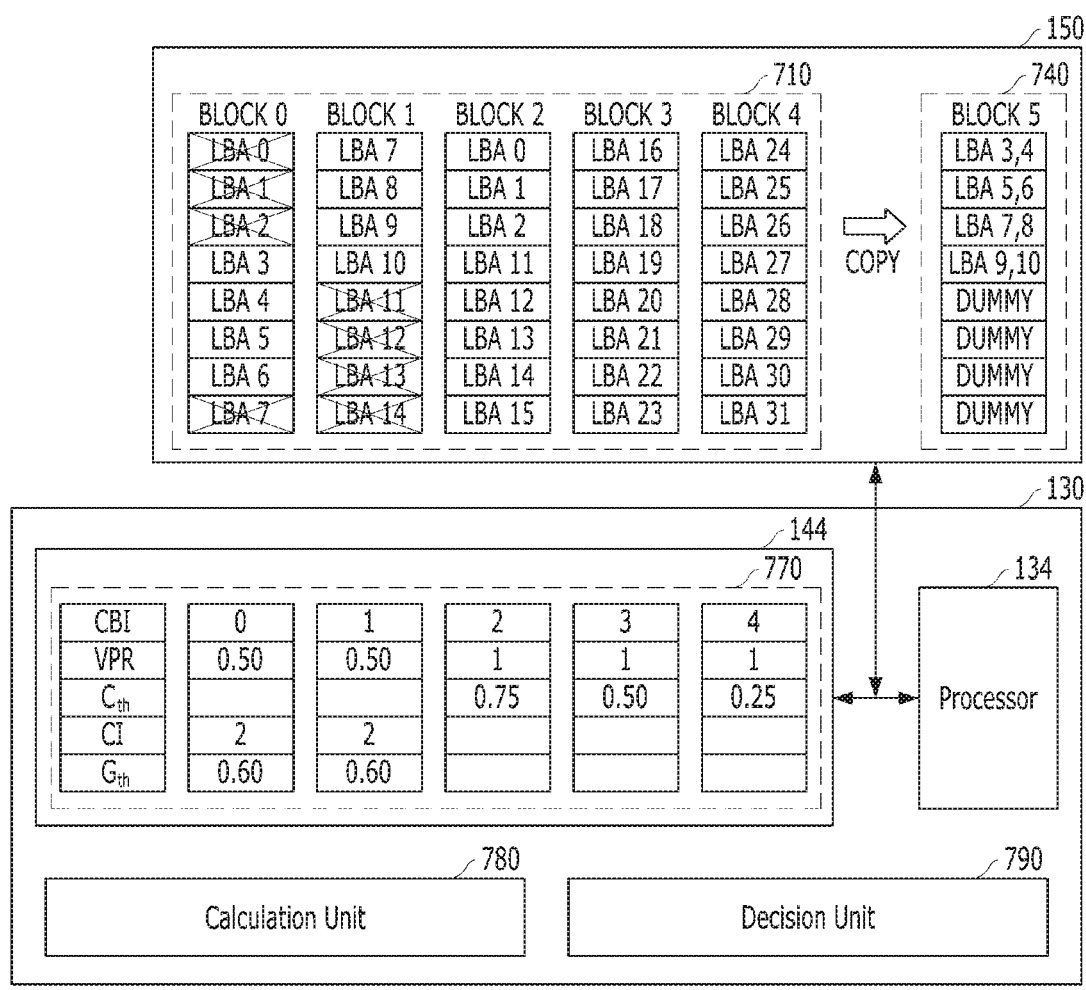

FIG. 9 shows an example case where the first memory block BLOCK 3 is closed after the processor 134 programs $16^{th}$ to $23^{rd}$ logic address data LBA 16 to 23 corresponding to $16^{th}$ to $23^{rd}$ logic addresses to the first memory block BLOCK 3 of the first memory block group 710, and then the first memory block BLOCK 4 is closed after the processor 134 programs $24^{th}$ to $31^{st}$ logic address data LBA 24 to 31 corresponding to $24^{th}$ to $31^{st}$ logic addresses to the first memory block BLOCK 4 of the first memory block group 710.

FIG. 9 shows the first memory blocks BLOCK 3 and 4 sequentially programmed and closed after completion of steps S510 and S520 for the first memory blocks BLOCK 1 and 2 as described with reference to FIG. 8. Due to the closed first memory blocks BLOCK 3 and 4, the processor 134 may write or update the closed block index CBI, the valid page ratio VPR and the copy candidate decision value $C_{th}$ of each of the closed first memory blocks BLOCK 0 to 4 in the metadata table 770 of the memory 144.

Since the valid page ratios VPR (exemplarily having values '1', '1' and '1') respectively exceed the copy candidate decision value $C_{th}$ (exemplarily having values '0.75', '0.5' and '0.25') of the respective first memory blocks BLOCK 2 to 4, the processor 134 may perform step S514 instead of step S513 to the respective first memory blocks BLOCK 2 to 4. Accordingly, as exemplified in FIG. 9, the metadata (i.e., the candidate index CI and the copy value $G_{th}$) for the closed first memory blocks BLOCK 2 to 4 may not be written or updated in the metadata table 770 for the closed first memory blocks BLOCK 2 to 4 according to step S513 and the subsequent steps.

Also, since the valid page ratio VPRs (exemplarily having values '0.5' and '0.5') are respectively equal to or smaller than the copy values $G_{th}$ (exemplarily having values '0.6' and '0.6') of the respective first memory blocks BLOCK 0 and 1, the processor 134 may perform step S524 to the first memory blocks BLOCK 0 and 1. Therefore, the valid data, that is, the $3^{rd}$ to $10^{th}$ logic address data LBA 3 to 10 stored in the first memory blocks BLOCK 0 to 1 may be copied into the second memory block BLOCK 5 of the second memory block group 740. The second memory block BLOCK 5 may be a multi-level cell memory block capable of storing twice or more data than the first memory blocks BLOCK 0 to 4. Accordingly, as exemplified in FIG. 9, the second memory block BLOCK 5 may store twice data than the first memory blocks BLOCK 0 to 4. Also, when the second memory block BLOCK 5 is closed after the copy operation to the $3^{rd}$ to $10^{th}$ logic address data LBA 3 to 10, the closed block Index CBI of the second memory block BLOCK 5 may have a value '5' and thus the metadata of the first memory blocks BLOCK 0 to 4 may be updated.

Figure 10:
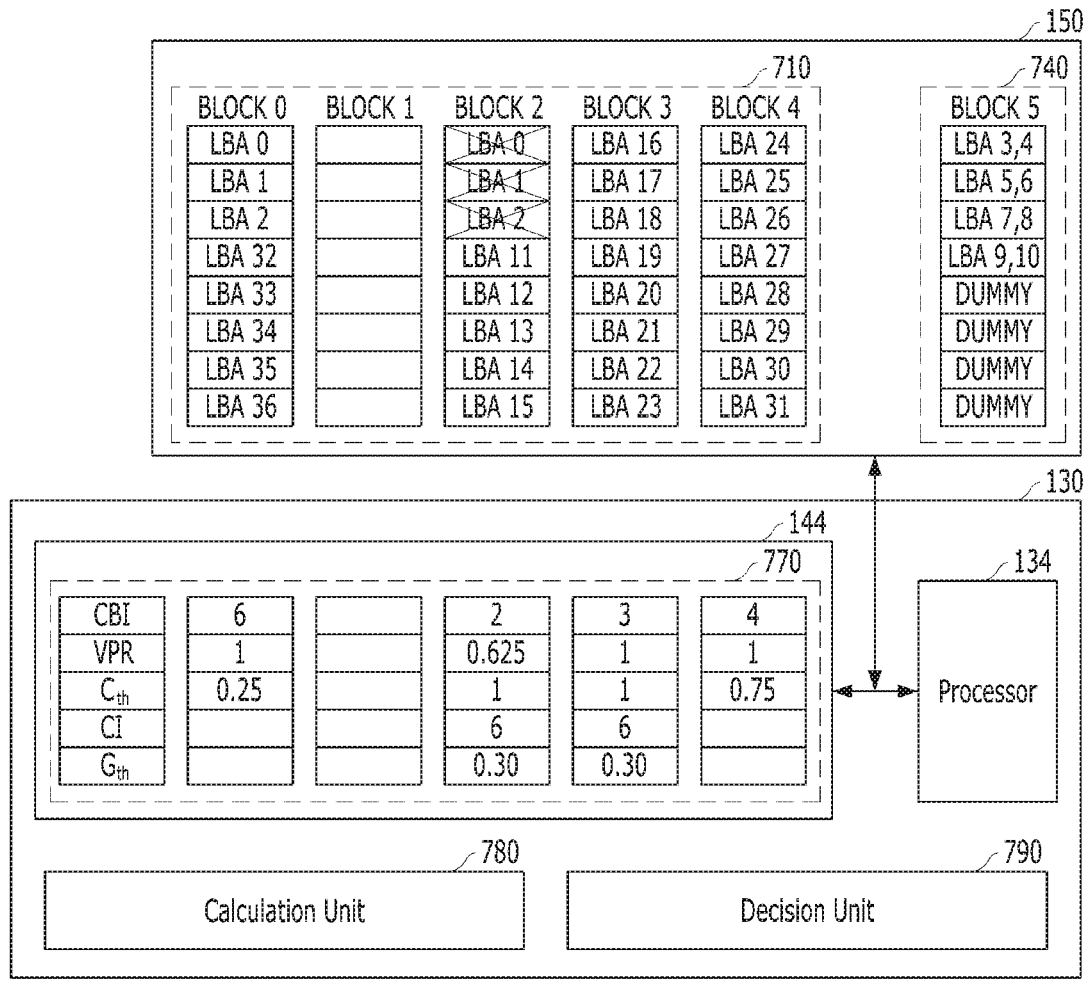

FIG. 10 shows an example case where the first memory block BLOCK 0 is closed after the processor 134 erase the first memory blocks BLOCK 0 and 1, and then program $0^{th}$ to $2^{nd}$ and $32^{nd}$ to 36th logic address data LBA 0 to 2 and 32 to 36 corresponding to $0^{th}$ to $2^{nd}$ and $32^{nd}$ to $36^{th}$ logic addresses to the first memory block BLOCK 0 of the first memory block group 710.

FIG. 10 shows the first memory block BLOCK 0 programmed and closed. Due to the closed first memory block BLOCK 0, the processor 134 may write or update the closed block indexes CBIs, the valid page ratios VPRs and the copy candidate decision values $C_{th}$ of the respective first memory blocks BLOCK 0 and 2 to 4 in the metadata table 770 of the memory 144.

As, exemplified in FIG. 10, the number of memory blocks closed until the first memory block BLOCK 0 becomes closed is six (i.e., the first memory blocks BLOCK 0 to 4 and the second memory block BLOCK 5) and thus the closed block index CBI of the closed first memory block BLOCK 0 may have a value '6'.

Since the valid page ratios VPRs (exemplarily having values '1' and '1') respectively exceed the copy candidate decision values $C_{th}$ (exemplarily having values '0.25' and '0.75') of the first memory block BLOCK 0 and 4, the processor 134 may perform step S514 instead of step S513 to the first memory block BLOCK 0 and 4.

However, since the valid page ratios VPRs (exemplarily having values '0.625' and '1') are respectively under the copy candidate decision values $C_{th}$ (exemplarily having values '1' and '1') of the first memory blocks BLOCK 2 and 3, the processor 134 may perform steps S513 and the subsequent steps (i.e., step S520) to the first memory blocks BLOCK 2 and 3. Therefore, the candidate index CI and the copy value $G_{th}$ of the respective first memory blocks BLOCK 2 and 3 may be written or updated.

As described with reference to FIGS. 5 to 10, in accordance with an embodiment of the prevent invention, after selecting a first memory block as a candidate for a copy operation, the processor 134 may copy into a second memory block the valid data stored in the selected first memory block. As a result, a number of program operations to the second memory block may be reduced and thus a lifetime of the second memory block may be increased.

Further, by selecting the first memory block as the candidate for a copy operation, the first memory block may be not selected as a target of the copy operation as soon as it is programmed. That is, the first memory block storing hot data may not be selected as a target of the copy operation. As a result, the hot data may be stored relatively longer in the first memory block, and thus a use frequency of the first memory block storing the hot data may be increased. As a result, the first memory block which is a single level cell SLC block may provide a fast programming speed for the hot data, and the lifetime of the second memory block which is a multi-level cell MLC or a triple-level cell TLC block may be extended compared to prior art through storing the hot data in the first memory block which is a single level cell SLC block.

In the above described embodiment, the processor 134 performs steps S510 and S520. However, it is noted that this is merely an example of the present invention. In other embodiments, the respective steps S510 and S520 may be performed by dedicated circuits or devices other than the processor 134. For example, the copy candidate decision value $C_{th}$ and the copy value $G_{th}$ for each of the first memory blocks BLOCK 0 to 4 may be calculated by a calculation unit, and the operation of deciding the copy candidate may be performed by a decision unit.

FIGS. 11 to 19 are diagrams schematically illustrating application examples of the data processing system of FIG. 1.

Figure 11:
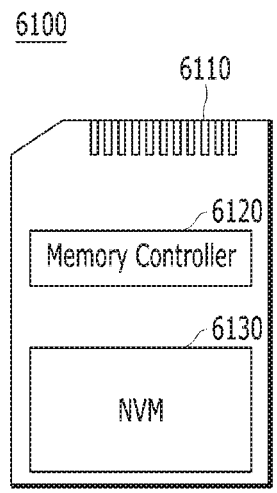
FIGS. 11 to 19 are diagrams schematically illustrating the other embodiments of a data process system including a memory system according to an embodiment of the present invention.

FIG. 11 is a diagram schematically illustrating another example of the data processing system including the memory system in accordance with the present embodiment. FIG. 11 schematically illustrates a memory card to which a memory system in accordance with an embodiment of the present invention is applied.

Referring to FIG. 11, the memory card 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory card 6100 may be a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 12:
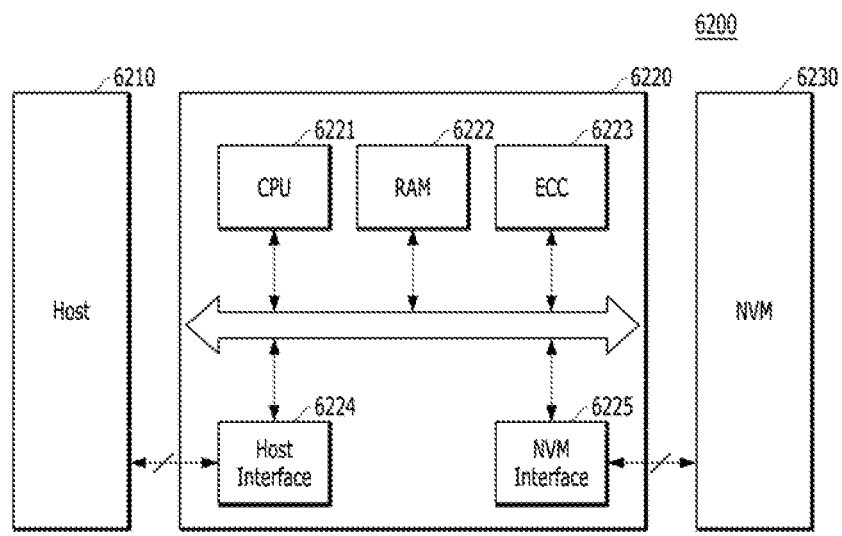

FIG. 12 is a diagram schematically illustrating another example of the data processing system including the memory system in accordance with the present embodiment.

Referring to FIG. 12, the data processing system 6200 may include a memory device 6230 having one or more nonvolatile memories and a memory controller 6220 for controlling the memory device 6230. The data processing system 6200 illustrated in FIG. 12 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WIFI or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 13:
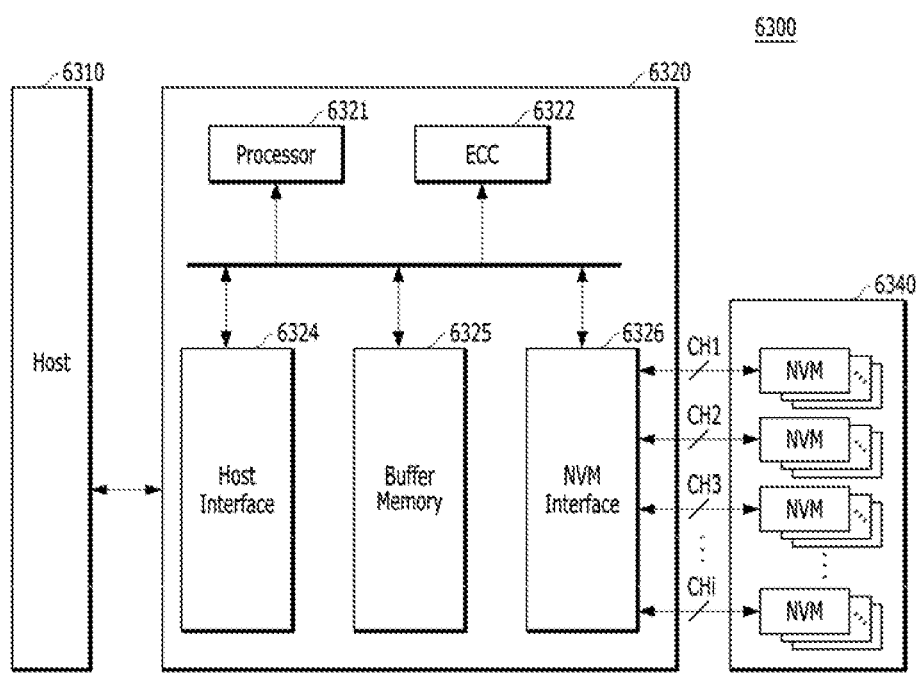

FIG. 13 is a diagram schematically illustrating another example of the data processing system including the memory system in accordance with the present embodiment. FIG. 13 schematically illustrates an SSD to which the memory system in accordance with the present embodiment is applied.

Referring to FIG. 13, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 13 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
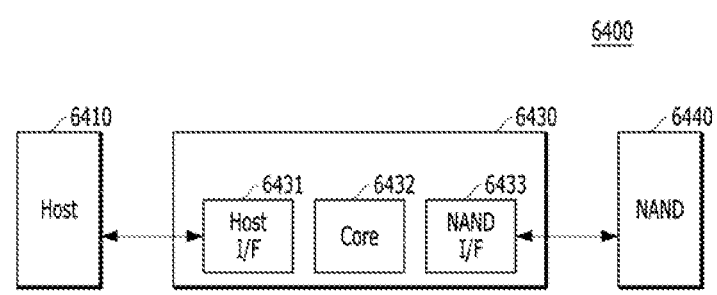

FIG. 14 is a diagram schematically illustrating another example of the data processing system including the memory system in accordance with the present embodiment. FIG. 14 schematically illustrates an embedded Multi-Media Card (eMMC) to which the memory system in accordance with the present embodiment is applied.

Referring to FIG. 14, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in accordance with the present embodiment. FIGS. 15 to 18 schematically illustrate UFS (Universal Flash Storage) systems to which the memory system in accordance with the present embodiment is applied.

Referring to FIGS. 15 to 18, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 12 to 14, and the UFS cards 6530, 6630, 6730 and 6830 may be embodied in the form of the memory card 6100 described with reference to FIG. 11.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 15:
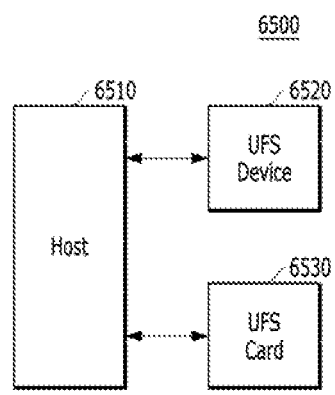

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 16:
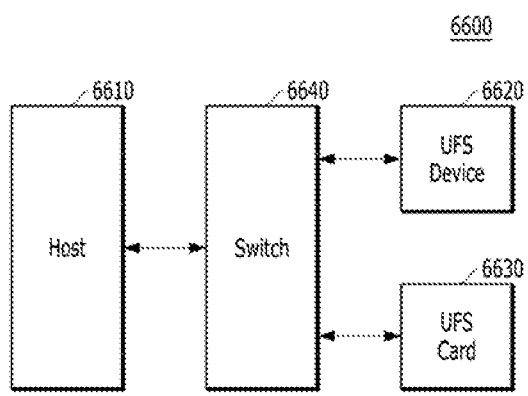

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 17:
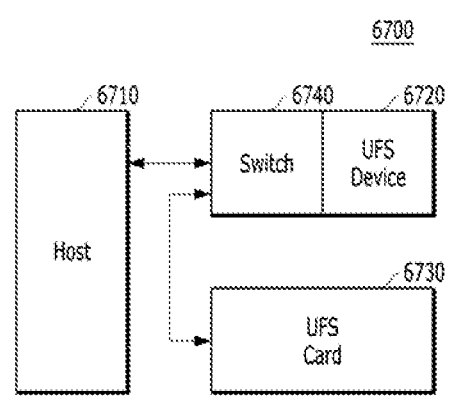

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
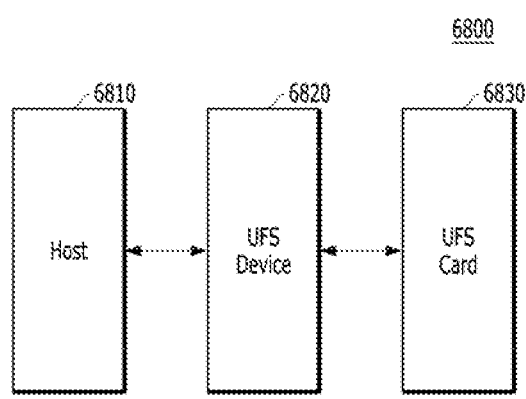

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
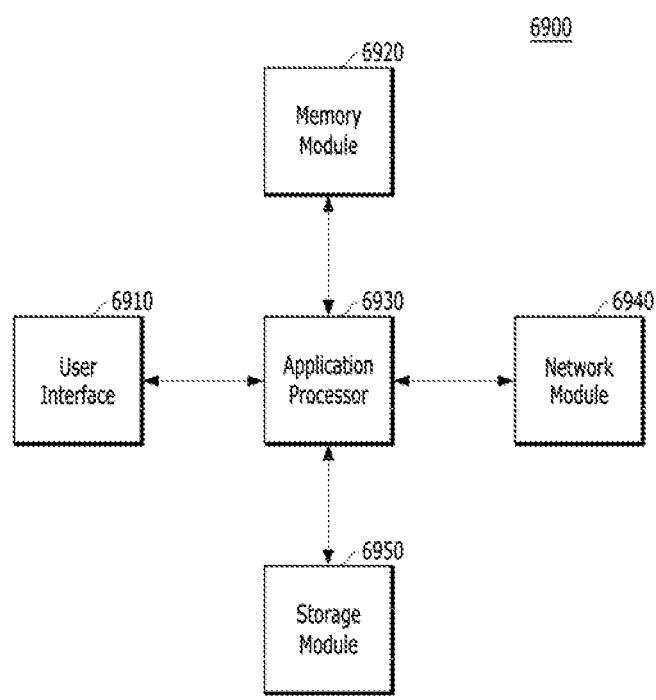

FIG. 19 is a diagram schematically illustrating another example of the data processing system including the memory system in accordance with an embodiment. FIG. 19 is a diagram schematically illustrating a user system to which the memory system in accordance with the present embodiment is applied.

Referring to FIG. 19, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data provided from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

Although various embodiments have been described for illustrative purposes, it will be apparent to those skilled in the art that various changes and modifications may be made without departing from the spirit and scope of the invention as defined in the following claims.

What is claimed is:

1. A controller for use in a memory system, the controller comprising:
a calculation unit suitable for calculating a first criteria value using a first aging value, a second criteria value using a second aging value, and a valid page ratio of each of a plurality of first memory blocks included in a first memory block group of a memory device of the memory system;
a decision unit suitable for deciding as a copy candidate a first memory block having a valid page ratio equal to or smaller than the first criteria value; and
a processor suitable for controlling the memory device to copy data of the copy candidate to a second memory block in the memory device when the valid page ratio of the copy candidate is equal to or smaller than the second criteria value.

2. The controller according to claim 1, wherein a memory cell of the second memory block stores more bits than a memory cell of each of the respective first memory block.

3. The controller according to claim 2, wherein an each of the first memory blocks is a single-level cell memory block and the second memory block is a multi-level cell memory block or a triple-level cell memory block.

4. The controller according to claim 2, wherein the first criteria value of the respectively first memory blocks is increased according to the first aging value of the respective first memory blocks.

5. The controller according to claim 4,
wherein the first aging value of the respective first memory blocks is obtained by subtracting a closed block index of the respective first memory blocks from a largest one among closed block indexes of the first memory blocks, and
wherein the closed block index of the respective first memory blocks is a number of the other first memory blocks, which become closed until the respective first memory blocks are programmed.

6. The controller according to claim 5,
wherein the first criteria value and the first aging value of the respective first memory blocks have a relationship represented by the following equation 1:

$$C_{th} = \alpha \times \left(\frac{A}{\beta} + \gamma\right) \quad \text{[Equation 1]}$$

wherein the $C_{th}$ is the first criteria value of the respective first memory blocks, $\alpha$, $\beta$ and $\gamma$ are predetermined weighted values, and A is the first aging value of the respective first memory block.

7. The controller according to claim 2, wherein the second criteria value of the respective first memory blocks is increased according to the second aging value of the respective first memory blocks.

8. The controller according to claim 7,
wherein the second aging value of the respective first memory blocks is obtained by subtracting a copy index of the respective first memory blocks from a largest one among closed block indexes of the first memory blocks and,
wherein a closed block index of the respective first memory blocks is a number of the other first memory blocks, which become closed until the respective first memory block is programmed and,
the copy index is a number of the first memory blocks, which become closed until a moment when the copy candidate is decided.

9. The controller according to claim 8, wherein the second criteria value and the second aging value of the respective first memory blocks have a relationship represented by the following equation 2:

$$G_{th} = \delta \times \left(\frac{B}{\varepsilon} + \zeta\right), \quad \text{[Equation 2]}$$

and
wherein the $G_{th}$ is the second criteria value of the respective first memory blocks, $\delta$ and $\varepsilon$ are weights of a predetermined amount, ζ is a predetermined weighted value and the B is the second aging value of the respective first memory blocks.

10. The controller according to claim 2, wherein the processor copies valid data among data of the copy candidate to the second memory block.

11. A method for operating a controller, the method comprising:
calculating a first criteria value using a first aging value for a valid page ratio of respective first memory blocks included in a first memory block group of a memory device;
deciding as a copy candidate a first memory block, the valid page ratio of which is equal to or smaller than the first criteria value, in the first memory block group;
calculating a second criteria value using a second aging value for a valid page ratio of the copy candidate; and
controlling the memory device to copy data of the copy candidate to a second memory block in the memory device when the valid page ratio of the copy candidate is equal to or smaller than the second criteria value.

12. The method according to claim 11, wherein a memory cell of the second memory block stores more bits than a memory cell of the respective first memory blocks.

13. The method according to claim 12, wherein each of the first memory blocks is a single-level cell memory block and the second memory block is a multi-level cell memory block or a triple-level cell memory block.

14. The method according to claim 12, wherein the first criteria value of the respective first memory blocks is increased according to the first aging value of the respective first memory blocks.

15. The method according to claim 14,
Wherein the first aging value of the respective first memory blocks is obtained by subtracting a closed block index of the respective first memory blocks, and
Wherein the closed block index of the respective first memory blocks is a number of the other first memory blocks, which become closed until the respective first memory blocks are programmed.

16. The method according to claim 15,
wherein the first criteria value and the first aging value of the respective first memory blocks have the relationship represented by the following equation 1:

$$C_{th} = \alpha \times \left(\frac{A}{\beta} + \gamma\right),\qquad \text{[Equation 1]}$$

and
wherein the $C_{th}$ is the first criteria value of the respective first memory blocks, α, β and γ are predetermined weighted value, A is the first aging value of the respective first memory blocks.

17. The method according to claim 12,
wherein the second criteria value of the respective first memory blocks is increased according to the second aging value of the respective first memory blocks.

18. The method according to claim 17,
wherein the second aging value of the respective first memory blocks is obtained by subtracting a copy index of the respective first memory blocks from a largest one among closed block indexes of the first memory blocks,
wherein a closed block index of the respective first memory blocks is a number of the other first memory blocks, which become closed until the respective first memory blocks are programmed and,
the copy index is a number of the first memory blocks, which become closed until a moment when the copy candidate is decided.

19. The method according to claim 18,
wherein the second criteria value and the second aging value of the respective first memory blocks have a relationship represented by the following equation 2:

$$G_{th} = \delta \times \left(\frac{B}{\varepsilon} + \zeta\right),\qquad \text{[Equation 2]}$$

and
wherein the $G_{th}$ is the second criteria value of the respective first memory blocks, δ, ε and ζ are predetermined weighted values and the B is the second aging value of the respective first memory blocks.

20. The method according to claim 12,
wherein the controlling of the memory device includes copying valid data among data of the copy candidate to the second memory block.

* * * * *